United States Patent
Levy et al.

(10) Patent No.: US 10,491,521 B2
(45) Date of Patent: Nov. 26, 2019

(54) FIELD CHECKING BASED CACHING OF ACL LOOKUPS TO EASE ACL LOOKUP SEARCH

(71) Applicant: Mellanox Technologies TLV Ltd., Raanana (IL)

(72) Inventors: Gil Levy, Hod Hasharon (IL); Pedro Reviriego, Madrid (ES); Salvatore Pontarelli, Rome (IT); Aviv Kfir, Nili (IL)

(73) Assignee: Mellanox Technologies TLV Ltd., Raanana (IL)

( * ) Notice: Subject to any disclaimer, the term of this patent is extended or adjusted under 35 U.S.C. 154(b) by 125 days.

(21) Appl. No.: 15/469,530

(22) Filed: Mar. 26, 2017

(65) Prior Publication Data

US 2018/0278525 A1 Sep. 27, 2018

(51) Int. Cl.
*H04L 12/743* (2013.01)
*H04L 12/745* (2013.01)

(52) U.S. Cl.
CPC ........ *H04L 45/7453* (2013.01); *H04L 45/748* (2013.01); *H04L 45/7457* (2013.01)

(58) Field of Classification Search
None
See application file for complete search history.

(56) References Cited

U.S. PATENT DOCUMENTS

| | | | |
|---|---|---|---|
| 6,611,875 B1 | 8/2003 | Chopra et al. | |
| 6,754,662 B1 | 6/2004 | Li et al. | |
| 6,957,215 B2 | 10/2005 | Stark | |
| 7,051,078 B1 | 5/2006 | Cheriton | |
| 7,054,315 B2 | 5/2006 | Liao | |
| 7,061,874 B2 | 6/2006 | Merugu et al. | |
| 7,116,663 B2 | 10/2006 | Liao | |
| 7,234,019 B1 | 6/2007 | Kao et al. | |
| 7,804,699 B2 | 9/2010 | Gupta et al. | |
| 7,933,282 B1 | 4/2011 | Gupta et al. | |
| 8,271,564 B2 | 9/2012 | Dade et al. | |
| 8,290,934 B2 | 10/2012 | Stergiou et al. | |
| 8,305,271 B2 | 11/2012 | Li et al. | |
| 8,462,786 B2 | 6/2013 | Liu et al. | |
| 8,619,766 B2 | 12/2013 | Wang et al. | |
| 8,856,203 B1 | 10/2014 | Schelp et al. | |
| 9,111,615 B1 | 8/2015 | Jiang | |

(Continued)

FOREIGN PATENT DOCUMENTS

WO  2004095784 A2  11/2004

OTHER PUBLICATIONS

Levy et al., U.S. Appl. No. 15/086,095, filed Mar. 31, 2016.

(Continued)

*Primary Examiner* — Adnan Baig
(74) *Attorney, Agent, or Firm* — Kligler & Associates

(57) ABSTRACT

In a network element cache operation is enhanced by extracting a set of fields from a packet, constructing a hash key from the extracted fields, and identifying a subset of the fields, wherein the field values thereof fail to exist in a set of classification rules. The hash key by is modified by masking the subset of the extracted fields. A hash lookup is performed using the modified hash key in a cache memory that stores a portion of the classification rules. The packet is processed responsively to the lookup.

14 Claims, 2 Drawing Sheets

(56) References Cited

U.S. PATENT DOCUMENTS

| | | | |
|---|---|---|---|
| 9,171,030 | B1 | 10/2015 | Arad et al. |
| 9,223,711 | B2 | 12/2015 | Philip et al. |
| 9,262,312 | B1 | 2/2016 | Gazit et al. |
| 9,317,517 | B2 | 4/2016 | Attaluri et al. |
| 9,344,366 | B2 | 5/2016 | Bouchard et al. |
| 9,424,366 | B1 | 8/2016 | Gazit et al. |
| 9,438,505 | B1 | 9/2016 | Zhou et al. |
| 9,569,561 | B2 | 2/2017 | Wildman et al. |
| 9,596,181 | B1 | 3/2017 | Goel et al. |
| 9,659,046 | B2 | 5/2017 | Sen et al. |
| 9,704,574 | B1 | 7/2017 | Shamis |
| 9,779,123 | B2 | 10/2017 | Sen et al. |
| 9,785,666 | B2 | 10/2017 | Li et al. |
| 2001/0028651 | A1 | 10/2001 | Murase |
| 2002/0089937 | A1 | 7/2002 | Venkatachary et al. |
| 2004/0085953 | A1 | 5/2004 | Davis |
| 2005/0038907 | A1 | 2/2005 | Roeder et al. |
| 2005/0091443 | A1 | 4/2005 | Hershkovich et al. |
| 2006/0209725 | A1* | 9/2006 | Cadambi ............ H04L 12/2854 370/255 |
| 2008/0192754 | A1 | 8/2008 | Ku et al. |
| 2008/0228691 | A1 | 9/2008 | Shavit et al. |
| 2009/0077076 | A1 | 3/2009 | Berger et al. |
| 2010/0040066 | A1 | 2/2010 | Hao et al. |
| 2010/0080223 | A1 | 4/2010 | Wong et al. |
| 2010/0269024 | A1 | 10/2010 | Hao et al. |
| 2012/0275466 | A1 | 11/2012 | Bhadra et al. |
| 2013/0311492 | A1 | 11/2013 | Calvignac et al. |
| 2014/0006706 | A1 | 1/2014 | Wang |
| 2014/0089498 | A1 | 3/2014 | Goldfarb et al. |
| 2014/0201307 | A1 | 7/2014 | Banavalikar et al. |
| 2014/0215144 | A1 | 7/2014 | Valency et al. |
| 2014/0310307 | A1 | 10/2014 | Levy et al. |
| 2015/0058595 | A1 | 2/2015 | Gura et al. |
| 2015/0098470 | A1 | 4/2015 | Sun et al. |
| 2015/0127900 | A1 | 5/2015 | Dharmapurikar et al. |
| 2015/0131665 | A1 | 5/2015 | Griswold |
| 2015/0207735 | A1 | 7/2015 | Kuramoto |
| 2015/0242429 | A1* | 8/2015 | Varvello ............ H04L 45/7453 707/752 |
| 2015/0244842 | A1 | 8/2015 | Laufer et al. |
| 2016/0294625 | A1 | 10/2016 | Mahkonen et al. |
| 2016/0335296 | A1 | 11/2016 | Sathe et al. |
| 2017/0046395 | A1 | 2/2017 | Li et al. |
| 2017/0052731 | A1 | 2/2017 | Levy et al. |
| 2017/0053012 | A1 | 2/2017 | Levy et al. |
| 2017/0068669 | A1 | 3/2017 | Levy et al. |
| 2017/0147254 | A1 | 5/2017 | Adams et al. |
| 2017/0195253 | A1 | 7/2017 | Annaluru et al. |
| 2017/0346765 | A1 | 11/2017 | Immidi |

OTHER PUBLICATIONS

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", 6 pages, year 2000 (http://www.partow.net/programming/hashfunctions).

Demetriades et al., "An Efficient Hardware-basedMulti-hash Scheme for High Speed IP Lookup", 16th IEEE Symposium on High Performance Interconnects, pp. 103-110, Aug. 26-28, 2008.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Levy et al., U.S. Appl. No. 15/257,957, filed Sep. 7, 2016.

Kasnavi et al., "A cache-based internet protocol address lookup architecture", Computer Networks, vol. 52, pp. 303-326, year 2008.

Kravchik et al., U.S. Appl. No. 15/186,477, filed Jun. 19, 2016.

Gupta et al., "Routing Lookups in Hardware at Memory Access Speeds", Proceedings of the Conference on Computer Communications (IEEE INFOCOMM), vol. 3, pp. 1241-1248, San Francisco, USA, Mar./Apr. 1998.

Kim et al, "Revisiting Route Caching: TheWorld Should Be Flat", Proceedings of the 10th International Conference on Passive and Active Network Measurement (PAM), 10 pages, Seoul, Korea, Apr. 1-3, 2009.

Kohler et al., "Observed Structure of Addresses in IP Traffic", IEEE/ACM Transactions on Networking, vol. 14, No. 6, pp. 1207-1218, Dec. 2006.

Liu et al., "Efficient FIB Caching using Minimal Non-overlapping Prefixes", ACM SIGCOMM Computer Communication Review, vol. 43, No. 1, pp. 15-21, Jan. 2013.

Sarrar et al., "Leveraging Zipf's Law for Traffic Offloading", ACM SIGCOMM Computer Communication Review, vol. 42, No. 1, pp. 17-22, Jan. 2012.

WAND Network Research Group, 7 pages, Apr. 22, 2010 (downloaded from http://wand.net.nz/wits/catalogue.php).

The CAIDA Anonymized Internet Traces 2014 Dataset, 2 pages, 2014 (https://www.caida.org/data/passive/passive_2014_dataset.xml).

Waldvogel et al., "Scalable High-Speed Prefix Matching", Proceedings of the ACM SIGCOMM 97 Conference on applications, technologies, architectures, and protocols for computer communication, Cannes, France, pp. 25-36, Sep. 15-18, 1997.

Kfir et al., U.S. Appl. No. 15/186,562, filed Jun. 20, 2016.

U.S. Appl. No. 14/827,402 office action dated Jul. 17, 2018.

Hua et al., "Variable-Stride Multi-Pattern Matching for Scalable Deep Packet Inspection", IEEE INFOCOM, pp. 415-423, Rio de Janeiro, Brazil, Apr. 19-25, 2009.

U.S. Appl. No. 15/186,562 office action dated Jan. 4, 2018.

EP Application # 17176740.3 search report dated Oct. 5, 2017.

U.S. Appl. No. 14/827,373 office action dated Oct. 6, 2017.

U.S. Appl. No. 14/846,777 office action dated Nov. 30, 2017.

European Application # 17189940 search report dated Jan. 26, 2018.

Che et al., "DRES: Dynamic Range Encoding Scheme for TCAM Coprocessors", IEEE Transactions on Computers, vol. 57, No. 7, pp. 902-915, Jul. 2008.

Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.

(56) References Cited

OTHER PUBLICATIONS

Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.
Liu et al., "Complete Redundancy Removal for Packet Classifiers in TCAMs", IEEE Transactions on Parallel and Distributed Systems, vol. 21, No. 4, pp. 424-437, Apr. 2010.
Taylor et al., "Scalable Packet Classification using Distributed Crossproducting of Field Labels", IEEE Infocom, pp. 1-12, year 2005.
U.S. Appl. No. 15/663,758 office action dated Mar. 28, 2019.
U.S. Appl. No. 14/827,402 office action dated Apr. 16, 2019.
U.S. Appl. No. 16/039,372 Office Action dated Jul. 23, 2019.

\* cited by examiner

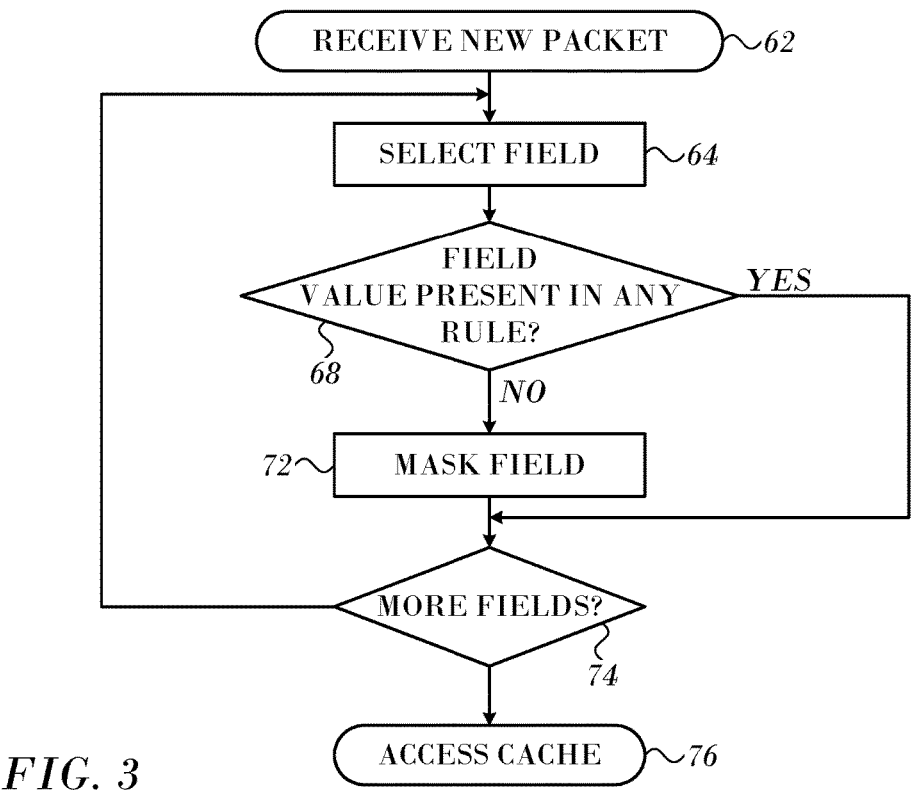
*FIG. 3*
*FIG. 4*
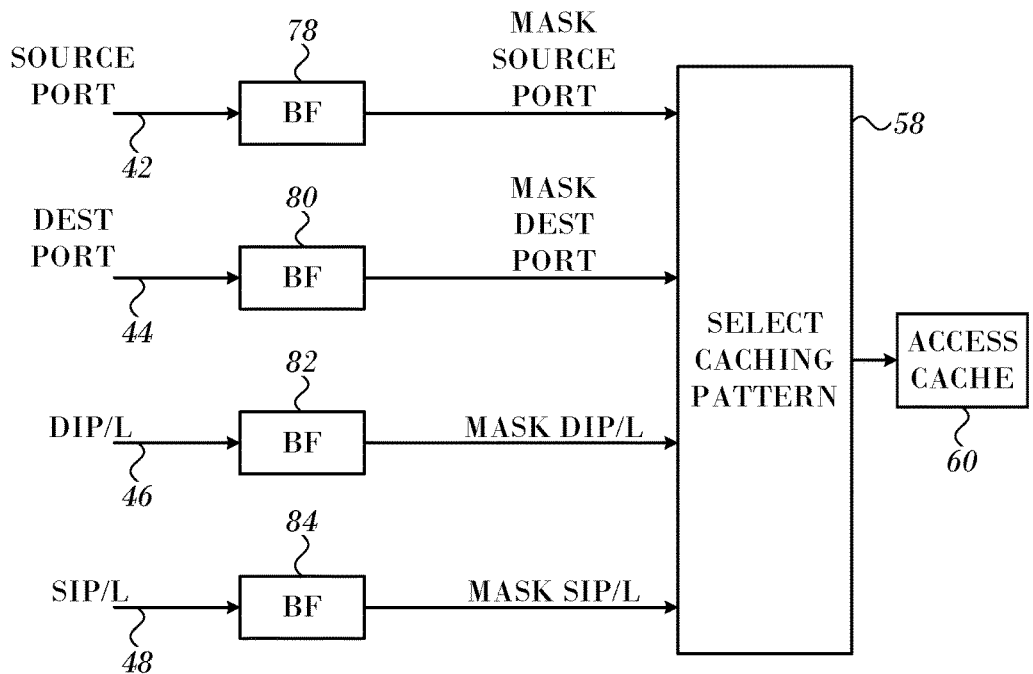

FIELD CHECKING BASED CACHING OF ACL LOOKUPS TO EASE ACL LOOKUP SEARCH

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information. More particularly, this invention relates to cache operations in the routing of packets in data switching networks.

2. Description of the Related Art

The meanings of certain acronyms and abbreviations used herein are given in Table 1.

TABLE 1

Acronyms and Abbreviations

| | |
|---|---|
| ACL | Access Control List |
| ASIC | Application-Specific Integrated Circuit |
| DIP | Destination IP Address |
| IP | Internet Protocol |
| LPM | Longest Prefix Match |
| SIP | Source IP Address |
| SRAM | Static Random Access Memory |
| TCAM | Ternary Content Addressable Memory |
| TCP | Transmission Control Protocol |

In some networking applications, each incoming packet is checked against a set of rules. This is, for example, the case in Access Control Lists (ACLS) and Firewalls, and also in software defined networking applications. In most cases, the rules check a number of fields of the packet, for example source and destination IP addresses (SIP/DIP, source and destination ports, protocol type and some flag bits.

In one important modern application, Internet routers determine data routing based on searching for a packet destination IP address (DIP) in a database of forwarding information known as a routing table. The routing table, rather than storing a full DIP, stores only some of the leading portion, known as a prefix. The prefix comprises some number of the most significant bits of the DIP. The remaining bits are treated as "don't care" bits for purpose of a DIP search in the routing table. However they specify a subnetwork or subnet. Computers that belong to a subnetwork are addressed by a common prefix in their IP address.

The most specific of the matching table entries—the one with the longest subnet mask—is called the longest prefix match (LPM). This is the entry in the routing table in which the largest number of leading address bits of the destination address match those in the packet.

Searching the routing table for the LPM is a bottleneck in routing throughput. Various hardware-based solutions have been proposed. However, the circuitry required to implement such solutions becomes complex. Moreover, the increasing amount of internet traffic and demands for reduced latency have resulted in relatively costly router circuitry having high power consumption and heat dissipation.

In a hardware implementation, a natural way to implement the checking of the rules is to store them in a Ternary Content Addressable Memory (TCAM) that can check in parallel rules that have do not care bits. For example, the document, *A Cache-Based Internet Protocol Address Lookup Architecture*, Soraya Kasnavi et al., Computer Networks 52 (2008) 303-326, proposes a Ternary Content Addressable Memory with a hardware-based LPM matching method. TCAM is advantageous in that it is able to hold search entries that contain not only ones and zeroes, to be matched against the key, but also "don't care" bits, which will match either the value zero or the value one in the key.

These "don't care" bits in the TCAM entries are commonly referred to as "masked" bits, while bits having a defined value (1 or 0) are referred to as "unmasked." TCAM thus affords a high degree of flexibility in rule definition.

However, TCAM, while reducing the number of hash lookups, is expensive in terms of circuit area and power, and it is not feasible to have large embedded TCAMs inside a packet processing ASIC. When the set of rules is very large, one option is to use an external TCAM device to store the rules. This however, limits the number of packets that can be checked per second as off-chip accesses are slower. In this scenario, it may be useful to cache packets that are frequently searched for inside the ASIC, so that only when there is a miss on this cache does the external TCAM need to be accessed. In such a configuration, the relevant fields of the packet are extracted and then an exact match lookup is done in the cache. This lookup can be efficiently implemented using for example Cuckoo hashing or any other suitable hashing scheme. It is well known that traffic in networks in general and on the Internet in particular is not uniformly distributed. Rather, the traffic has been shown to follow a heavy tail distribution that can be modeled with a power law of a Zipf distribution. Such distributions are observed per prefix, per IP address and per flow showing that in all cases most of the traffic concentrates on a small percentage of all the elements. This distribution can be exploited in a well-constructed caching scheme.

A problem of such a caching scheme is that each entry on the cache only matches packets that have exactly the same values on the packet fields. For example, for rules that use source and destination IP addresses, ports and the protocol (known as 5-tuple), each cache entry would only match packets with that 5-tuple that typically corresponds to a single connection. It can be seen that caching the exact 5-tuple match results in cache "pollution", i.e., many different cache entries are loaded unnecessarily into the cache, often causing other entries to be evicted and degrading performance.

SUMMARY OF THE INVENTION

According to disclosed embodiments of the invention, cache operations are improved by a preprocessing stage that reduces the number of entries that need to be added to the cache. The approach is particularly effective when the numbers of values of each field to be considered are small relative to the set of rules against which the packets are evaluated.

There is provided according to embodiments of the invention a method, which is carried out by extracting a set of fields from a packet received via a data network, constructing a hash key from the extracted fields, and identifying a subset of the fields, wherein the field values thereof fail to exist in a set of classification rules. The method is further carried out by modifying the hash key by masking the subset of the extracted fields. Using the modified hash key, the method is further carried out by performing a hash lookup to a cache memory that stores a portion of the classification rules, and processing the packet responsively to the lookup.

According to an aspect of the method, constructing a hash key includes generating a concatenation of the extracted fields.

According to one aspect of the method, constructing a hash key also includes adding a bit to each of the extracted fields, and setting the bit to a predetermined value only in the extracted fields of the subset.

According to a further aspect of the method, one of the fields and at least a portion of the classification rules comprise respective internet protocol addresses, and identifying a subset includes finding a longest prefix match between the internet protocol address of the one field and the internet protocol address of one of the classification rules.

According to still another aspect of the method, finding a longest prefix match is performed using a ternary content addressable memory (TCAM) that returns the length of the mask that can be used for caching.

According to yet another aspect of the method, identifying a subset is performed using a Bloom filter.

There is further provided according to embodiments of the invention an apparatus, including a network element that is operative for receiving packets via a data network, a processor in the network element, a main memory storing a set of classification rules, and a cache memory accessible to the processor. The cache memory stores a hash table of cache entries including a portion of the classification rules. The processor is operative for extracting a set of fields from a packet received via the data network, constructing a hash key from the extracted fields, identifying a subset of the fields, wherein the field values thereof fail to exist in the set of classification rules, modifying the hash key by masking the subset of the extracted fields, using the modified hash key to perform a hash lookup to the hash table, and transmitting the packet from the network element in accordance with a result of the hash lookup.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 3 is a flow chart of a method in accordance with an embodiment of the invention; and FIG. 4 is a diagram illustrating details of a preprocessing step in a cache operation in accordance with an alternate embodiment of the invention.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

System Description

Figure 1:
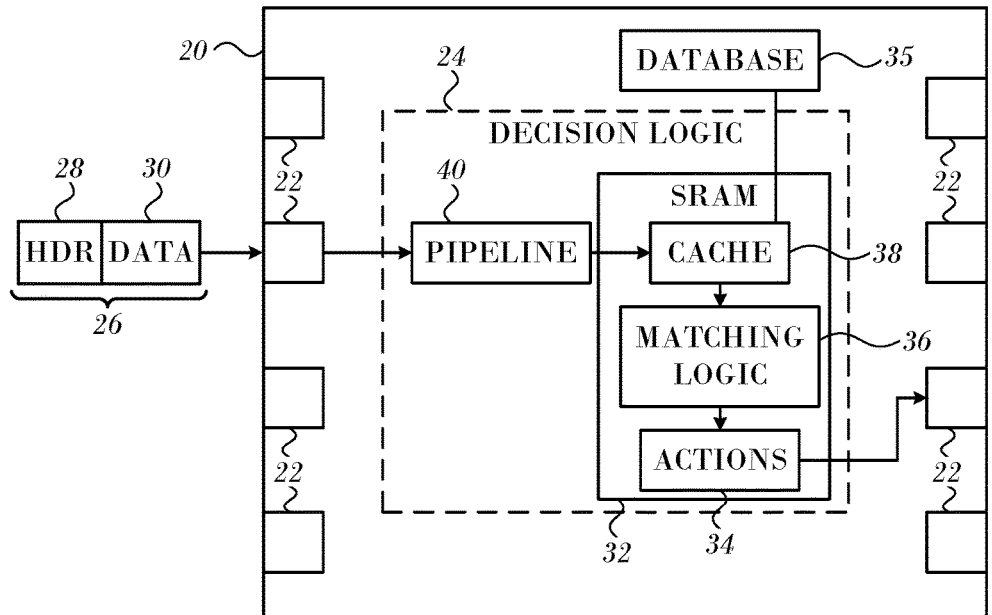
FIG. 1 is a block diagram that schematically illustrates a network element which classifies packets in accordance with an embodiment of the invention.

Turning now to the drawings, reference is initially made to FIG. 1, which is a block diagram that schematically illustrates a network element 20, which classifies packets in accordance with an embodiment of the invention. Typically, network element 20 is configured as a network switch or router, for example, with multiple ports 22 connected to a packet communication network. Decision logic 24 within element 20 applies classification rules in forwarding data packets 26 between ports 22, as well as performing other actions, such as encapsulation and de-capsulation, security filtering, and quality-of-service functions. The circuitry needed for carrying out such forwarding and other functions will be apparent to those skilled in the art and is omitted from the figures for the sake of simplicity, in order to concentrate on the actual classification functions of decision logic 24.

In the pictured embodiment, decision logic 24 receives packet 26 containing a header 28 and payload data 30 via a data network. A processing pipeline 40 in decision logic 24 extracts a classification key from each packet 26, typically (although not necessarily) including the contents of certain fields of header 28. For example, the key may comprise the source and destination addresses and ports and a protocol identifier. Pipeline 40 matches the key against a matching database 35 containing a set of rule entries, which is typically, but not necessarily, stored in an external device. An SRAM 32 contains a list of actions 34 to be performed when a key is found to match one of the rule entries in matching logic 36, which can be implemented in SRAM 32. For this purpose, each rule entry typically contains a pointer to the particular action that decision logic 24 is to apply to packet 26 in case of a match.

The balance between the size of the set of rule entries in database 35 and the size of cache 38 can be determined at the convenience of the designer of decision logic 24. In any case, cache 38 will be considerably smaller than would be required to hold the entire corpus of classification rules.

Pipeline 40 typically comprises dedicated or programmable hardware logic, which is configured to carry out the functions described herein. In some embodiments pipeline 40 may contain a number of banks of dedicated memory for implementation of the Bloom filters either on the same chip as the hardware logic or in a separate memory chip, as described in commonly assigned copending application Ser. No. 14/827,402, entitled High-Performance Bloom Filter Array, which is herein incorporated by reference. For example, pipeline 40 may comprise a suitable application-specific integrated circuit (ASIC). Alternatively or additionally, at least some of the functions of pipeline 40 may be implemented in a standalone or embedded microprocessor. For example, such a microprocessor may be responsible for compiling classification rules received by network element 20 into database 35. The microprocessor performs its functions under the control of software instructions, which are typically stored in tangible, non-transitory computer-readable storage media, such as electronic, optical, or magnetic memory media.

Rule Caching.

In many cases, such as access control lists (ACL), the rules that packets are checked against are constructed from a set of prefixes and port lists. For example a list of source IP prefixes and another list of destination IP prefixes are defined and then classification rules are created for any combination of those source and destination prefixes. This can be done to identify traffic that is exchanged across multiple sites of a company. This scheme can be refined if, for example, traffic is to be allowed only for a small subset of ports. As soon as the list for prefixes or ports starts to have a significant number of elements, the number of rules created will be large. For example, in order to identify traffic going from one of a list of 50 prefixes to any of another list of 50 prefixes with a destination port on a list of five possible ports, 50×50×5=12500 rules are needed. It can be seen that this creates an explosion of rules that is quadratic when two fields are used, cubic when three fields are used and grows even faster when more fields are used. In other cases, the rules may not be created from lists, but for some fields only a few values are used. This is for example the case with source and destination ports where in many cases only a few tens of port values are used in the rules.

A typical rule pattern is shown in Table 2. This pattern may correspond to a large number of actual rules, which share the same pattern of masked fields ('x'). Thus, any packet whose destination IP is 138.100.17.10 for port 80 and with protocol TCP would match that rule regardless of its source IP address or source port.

TABLE 2

(rule table)

| Source IP | Destination IP | Source port | Destination port | Protocol |
|---|---|---|---|---|
| x.x.x.x | 138.100.17.10 | x | 80 | TCP |

To make the cache more efficient, a key observation is that in many cases, even if the number of rules that need to be checked is very large, the number of values that exist in the database for each of the fields is small. A good example is source and destination ports. In many cases only a few tens of values for these fields exist in the database, even when the construction of rules is not based on the combination of lists for different fields.

Continuing with the example of source and destination ports, let us assume that we want to cache a packet that has a source port that is not specified in any of the rules. For example, such a packet having source port 4020 is shown in the first entry in Table 3. We assume that source port 4020 is not used in any of the rules.

TABLE 3

(List of Packets)

| Source IP | Destination IP | Source port | Destination port | Protocol |
|---|---|---|---|---|
| 120.23.10.4 | 138.100.17.10 | 4020 | 80 | TCP |
| 120.23.10.4 | 138.100.17.10 | 8432 | 80 | TCP |

Now consider the second entry in Table 3, which represents a packet having source port 8432. Assume that source port 8432 is also not found in any of the rules. In the rule matching process, it will be found that both entries in Table 3 match the exemplary rule in Table 2. Conventionally, each of the packets shown in Table 3 would require a different entry in cache 38.

The inventors have found that substantial performance improvement results when a preprocessing step is performed prior to determining whether to cache entries such as those in Table 3. Each of the fields is examined to determine whether its value is specified in the rules database. If so, then the current field is used in a cache lookup. Otherwise the current field is masked, i.e., set as "don't care" and not used in a cache lookup. Returning to the first entry in Table 3, port 4020 is not specified in any rule of the rules database. Therefore its source port field is set to "x". The result is shown in Table 4, and now matches both of the packets shown in Table 3. Conventionally a cache entry would be required for each of the two packets in Table 3. However, when the source port field is masked as described only a single cache entry is required. The single cache entry matches both of the packets shown in Table 3. It is apparent from this example that the only a single cache lookup is required to find the match.

The same procedure is used for cache lookup and for addition of new entries to the cache.

TABLE 4

(List of Cached Entries)

| Source IP | Destination IP | Source port | Destination port | Protocol |
|---|---|---|---|---|
| 120.23.10.4 | 138.100.17.10 | x | 80 | TCP |

Figure 2:
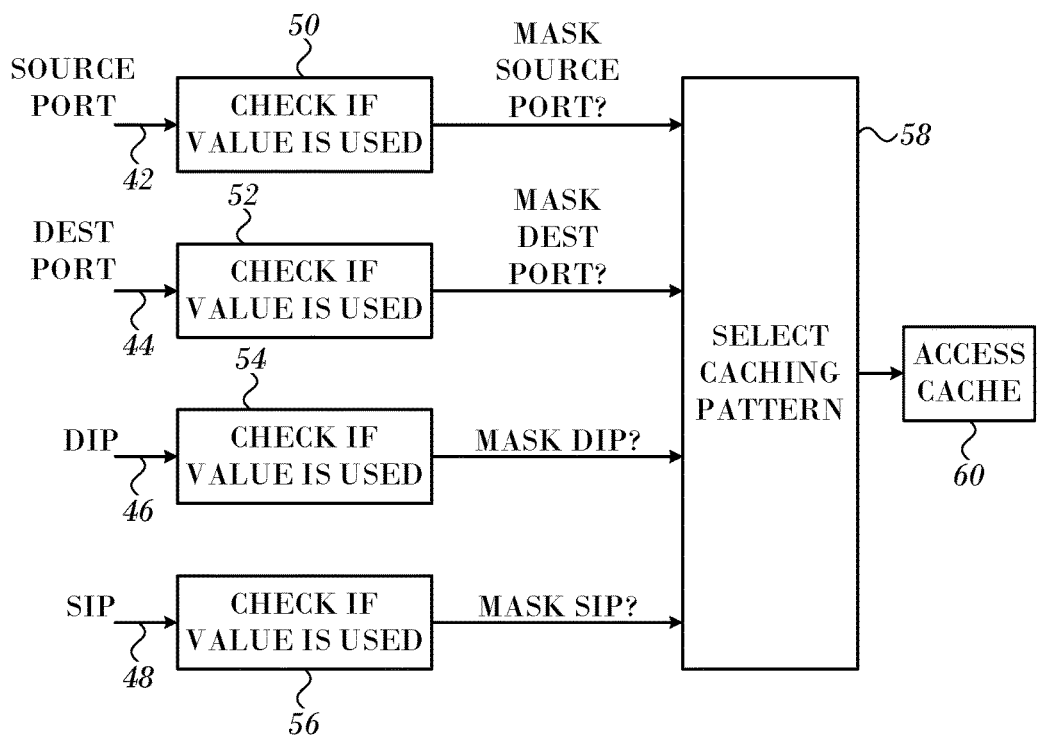
FIG. 2 is a diagram illustrating details of a preprocessing step a cache operation in accordance with an embodiment of the invention.

Reference is now made to FIG. 2, which is a diagram illustrating details of the preprocessing step in accordance with an embodiment of the invention. It is assumed that the packet fields include at least the first four columns in Tables 2-4. FIG. 2 lends itself to a hardware implementation in which all the fields can be examined concurrently. Source port input 42, destination port input 44, destination IP address 46 and source IP address 48 are input to field evaluation blocks 50, 52, 54, 56, respectively. The field values present on the database are searched in each of the field evaluation blocks 50, 52, 54, 56 to determine if the respective input field is specified. If any field is not specified in the rules data base, then the value of that field is masked and not used for hash lookup. The outputs of the field evaluation blocks 50, 52, 54, 56 are sent to block 58 in which a caching pattern is constructed, e.g., by concatenating the fields. The caching pattern is used in a cache lookup in block 60. Thereafter the packet is processed conventionally according to the outcome of the cache lookup.

Reference is now made to FIG. 3, which is a flow chart of a method, in accordance with an embodiment of the invention. The procedure to insert or search for a packet in the cache is summarized as follows:

(1). Extract the fields used in the rules from the packet.

(2). For each field value check if it exists on any of the rules in the set.

(3). Construct the key to be used for the hash and for the storage (insertion) or the comparison (search) by concatenating the fields but setting to all zeros (masking) the fields that had a negative result in step 2. Add a bit per field to the key, setting it to zero if the check in step 2 was negative or to one if it was positive.

(4). Perform the insertion/search operation using the key constructed in step 3. The implementation can use any suitable hash structure, for example cuckoo hash.

The process steps in FIG. 3 are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 62 a new packet is received in a network element for classification. Typically the packet is forwarded to another network element or to a host device. A cache, e.g., cache 38 (FIG. 1), is provided in the network element to facilitate lookup to a routing table, access control list, or other network application. In the steps that follow, for purposes of cache lookup and management the values of the fields in the new packets that are used for classification are evaluated against the set of values that are present in the rules. If the values are not significant in any of the rules, such fields of the new packet are masked, i.e., marked as "don't care".

At step 64 a field of the packet is selected. Reverting to the above example, the field could be any of the fields shown in Table 3.

Next, at decision step 68, it is determined if the content of the current packet field is significant, that is if it appears in any of the rules on the database. For example, if the field is an IP address, it might be determined whether there is a longest prefix match between the content of the field and the IP prefixes present on the rules in the data base. One method for evaluating the longest prefix match is disclosed in commonly assigned copending application Ser. No. 15/186, 477, entitled IP Route Caching with Two Search Stages on Prefix Length, which is herein incorporated by reference. Decision step 68 can be carried out with a small TCAM that stores the prefixes present on the data base and returns the length assigned to the longest matching prefix. This length would be the one of the longest prefix that is compatible with that prefix. Alternatively, Bloom filters can be used to get an estimation of the length that can be used for caching. In any case, because the set of values that need to be checked against the rules is small, decision step 68 can be carried out efficiently.

The determination at decision step 68 can be done using any suitable data structure. For example, for ports, a 64K bit memory can be used as there are only 64K possible port values.

It is important to remember that since the field checking needs to store only the values of a field that exists in the rules, it will store far fewer elements than the number of rules in a rule database. For example, 50 source IP addresses combined with 50 destination IP addresses and 5 ports can produce 12,500 rules, while storage of the number of values for the fields consists of just 50,50,5. Therefore, field-checking structures are very small relative to the storage needed for the rule database, and require little overhead in most implementations.

If the determination at decision step 68 is negative, then the current field was not significant, and can be safely disregarded. Control proceeds to step 72, where the current field is masked.

After performing step 72 or if the determination at decision step 68 above was affirmative, it is concluded that the current field cannot be disregarded. At decision step 74 it is determined if more fields of the new packet remain to be evaluated. If so, then control returns to step 64 to iterate the procedure with a different field. Otherwise control proceeds to final step 76. Preprocessing prior to cache lookup is completed by combining the preprocessing fields to form a key. A bit is added to each field of the key in order to prevent a packet with masked fields from inadvertently matching packets that have all zero values in some of the fields, should the zero value happen to occur in any of the rules. The cache is accessed using the key. In general a larger number of cache hits can be expected than would be the case without preprocessing as the key will have more "do not care" bits. The actual improvement of cache performance is highly application dependent.

Thereafter, the packet is processed by packet processing circuitry according to a particular network application. For example, the packet may be delivered directly to a host or forwarded through the data network according to a routing protocol, using routing information obtained from the cache. System throughput is increased as cache preprocessing reduces the need for relatively slow accesses to a larger database, such as an IP routing table or a large ACL.

Alternative Embodiment

Reference is now made to FIG. 4, which is a diagram illustrating details of the preprocessing step in accordance with an alternate embodiment of the invention. The data flow is similar to that shown in FIG. 2. However, in this embodiment approximate membership check functions using Bloom filters 78, 80, 82, 84 (BF) can also be used to perform decision step 68 (FIG. 3), i.e., determine if the content of the current packet field is significant. False positives would create additional cache entries because a value that is not mentioned in any rule might still produce a positive result when processed in the Bloom filter. This may be acceptable if the false positive rate of the Bloom filter is small.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
   storing a plurality of classification rules
   storing a hash table in a cache memory, the hash table having entries comprising rule patterns that correspond to a portion of the classification rules;
   extracting a set of fields from a packet received via a data network, the fields having respective field values;
   constructing a hash key from the extracted fields; and
   identifying a subset of the extracted fields, wherein when the field values of the subset of the extracted fields fail to exist in the classification rules performing the steps of:
   modifying the hash key by masking the subset of the extracted fields;
   identifying one of the entries using the modified hash key to perform a hash lookup to the hash table; and
   transmitting the packet in accordance with the classification rule that corresponds to the rule pattern of the identified entry.

2. The method according to claim 1, wherein constructing a hash key comprises generating a concatenation of the extracted fields.

3. The method according to claim 1, wherein constructing a hash key further comprises:
adding a bit to each of the extracted fields; and
setting the bit to a predetermined value only in the extracted fields of the subset.

4. The method according to claim 1, wherein one of the fields and at least a portion of the classification rules comprise respective internet protocol addresses, and identifying a subset comprises finding a longest prefix match between the internet protocol address of the one field and the internet protocol address of one of the classification rules.

5. The method according to claim 4, wherein finding a longest prefix match is performed using a ternary content addressable memory (TCAM) that returns a length of a mask that can be used for caching.

6. The method according to claim 1, wherein identifying a subset is performed using a Bloom filter.

7. An apparatus, comprising:
a network element, operative for receiving packets via a data network;
a processor in the network element;
a main memory storing a plurality of classification rules; and
a cache memory accessible to the processor, the cache memory storing a hash table, the hash table having entries comprising rule patterns that correspond to a portion of the classification rules, wherein the processor is operative for performing the steps of:
extracting a set of fields from a packet received via the data network, the fields having respective field values;
constructing a hash key from the extracted fields; and
identifying a subset of the extracted fields, wherein when the field values of the subset of the extracted fields fail to exist in the classification rules performing the steps of:
modifying the hash key by masking the subset of the extracted fields; and
identifying one of the entries using the modified hash key to perform a hash lookup to the hash table; and
transmitting the packet from the network element in accordance with the classification rule that corresponds to the rule pattern of the identified entry.

8. The apparatus according to claim 7, wherein constructing a hash key comprises generating a concatenation of the extracted fields.

9. The apparatus according to claim 7, wherein constructing a hash key further comprises:
adding a bit to each of the extracted fields; and
setting the bit to a predetermined value only in the extracted fields of the subset.

10. The apparatus according to claim 7, wherein one of the fields and at least a portion of the classification rules comprise respective internet protocol addresses, and identifying a subset comprises finding a longest prefix match between the internet protocol address of the one field and the internet protocol address of one of the classification rules.

11. The apparatus according to claim 10, wherein finding a longest prefix match is performed using a ternary content addressable memory (TCAM) that returns a length of a mask that can be used for caching.

12. The apparatus according to claim 7, wherein identifying a subset is performed using a Bloom filter.

13. The method according to claim 1, wherein identifying one of the entries is by performing a single hash lookup.

14. The apparatus according to claim 7, wherein identifying one of the entries is by performing a single hash lookup.

* * * * *